Feb. 15, 1955
G. GETTY
2,702,138
CRATE DUMPING APPARATUS
Filed Sept. 4, 1953
3 Sheets-Sheet 2
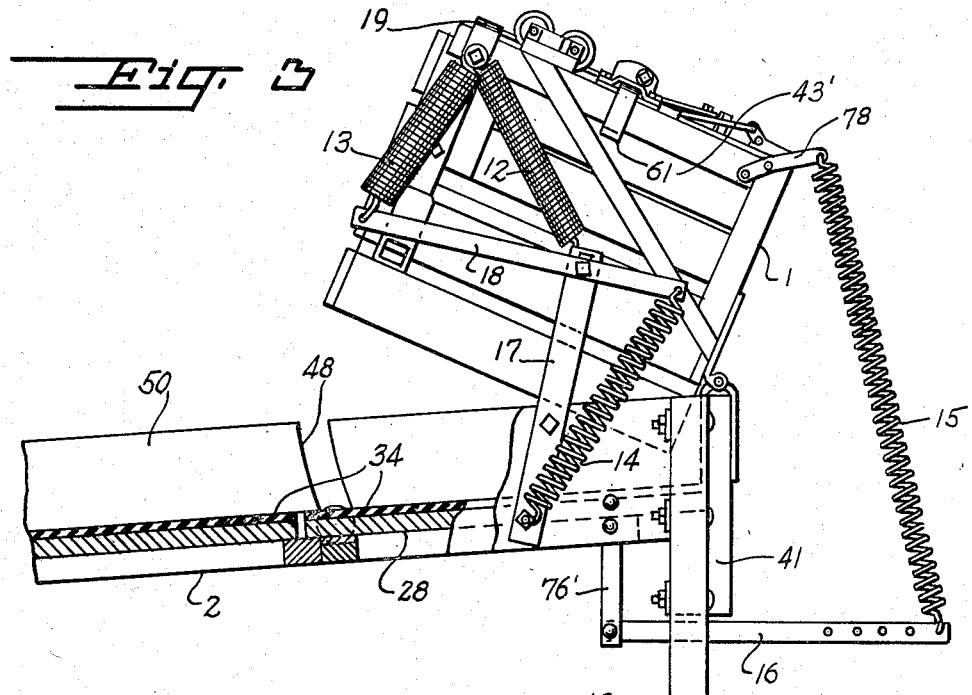
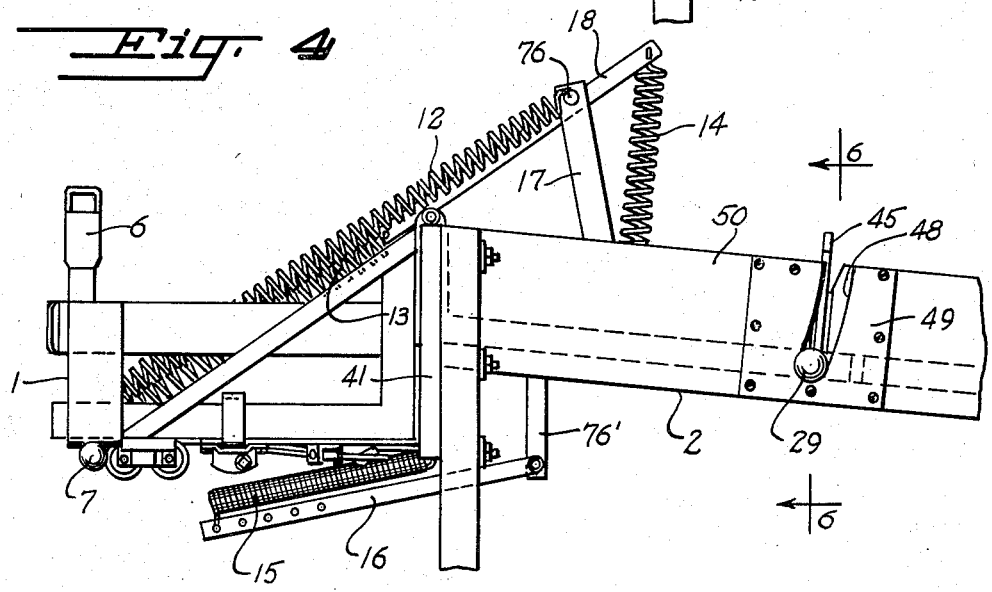
INVENTOR.
Glenn Getty
BY
McMorrow, Berman & Davidson
ATTORNEYS INVENTOR.
Glenn Getty

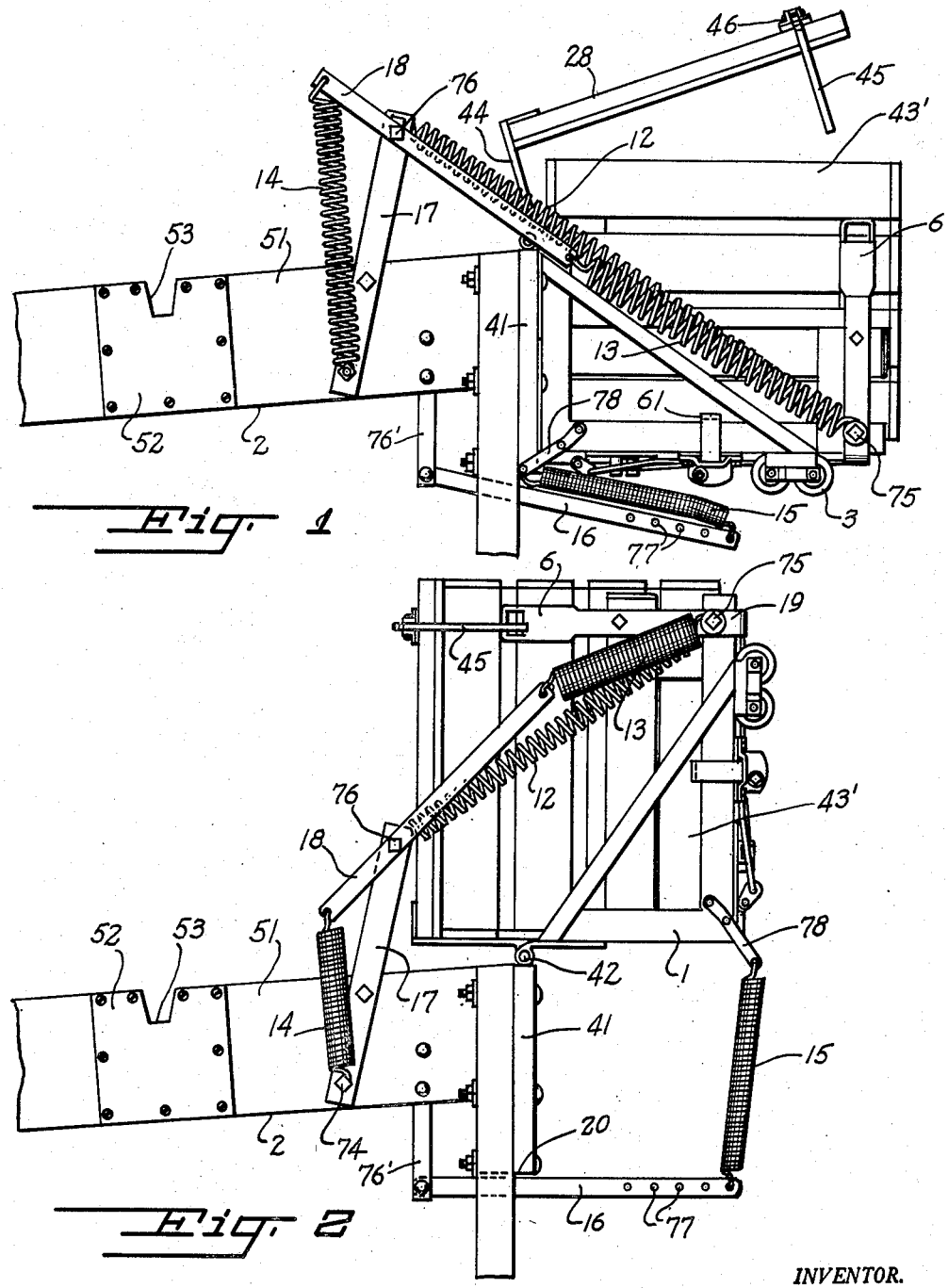

United States Patent Office 2,702,138
Patented Feb. 15, 1955

2,702,138

CRATE DUMPING APPARATUS

Glenn Getty, Sparta, Mich.

Application September 4, 1953, Serial No. 378,596

5 Claims. (Cl. 214—307)

This invention relates to crate dumping devices, and more particularly to an improved device for dumping the contents of a crate of fruit or other produce onto a table to enable the operator to grade the fruit or produce and to picked out decayed or damaged fruit or produce.

A main object of the invention is to provide a novel and improved apparatus for dumping a crate of fruit or produce onto a table, the apparatus being simple in construction, being easy to operate, and being arranged to minimize bruising or cutting of the product being dumped.

A further object of the invention is to provide an improved dumping apparatus for unloading a crate of fruit or other produce onto a table for the purpose of grading the fruit or produce or for picking out decayed or damaged fruit or produce, the apparatus being inexpensive to fabricate, being sturdy in construction, and being substantially automatic in operation.

Further objects and advantages of the invention will become apparent from the following description and claims, and from the accompanying drawings, wherein:

Figure 1 is a side elevational view of an improved dumping apparatus according to the present invention, shown with a crate installed therein preparatory to dumping the crate.

Figure 2 is a side elevational view of the apparatus and crate of Figure 1, showing the crate midway from the position of Figure 1 toward an inverted position.

Figure 3 is a side elevational view, partly in vertical cross section, showing the apparatus of Figures 1 and 2 and the crate therein with the crate near the end of its rotary movement and approaching its dumping position.

Figure 4 is a side elevational view of the apparatus in the position shown in Figure 1 but taken from the opposite side of the apparatus.

Figure 5:
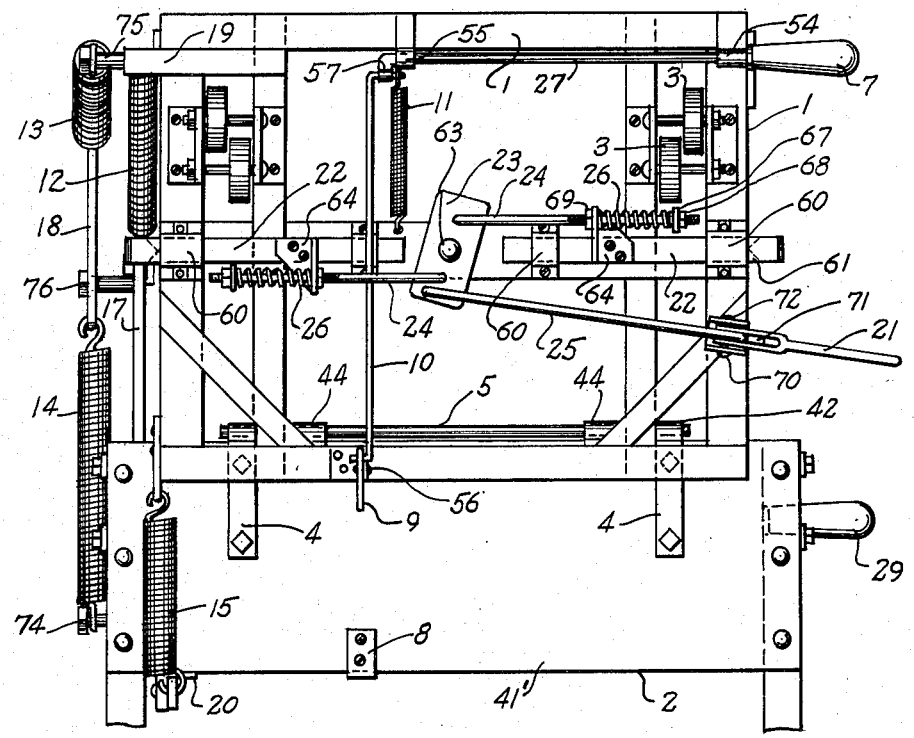
Figure 5 is a rear end elevation of the apparatus in the position of Figure 2.

Referring to the drawings, 2 designates a receiving table for fruit or similar produce to be graded, and 1 designates a crate-holding bracket hingedly connected to the top edge of a transverse, vertical plate member 41 secured to the end of the table 2, the hinged connection being shown at 42.

The crate-holding bracket assembly 1 comprises a suitable rectangular frame adapted to receive a crate 43' therein, the bottom portion of the bracket assembly 1 being provided with suitable rollers 3 facilitating the movement of the crate into the rectangular frame of the bracket assembly 1 when said bracket assembly is in the position illustrated in Figures 1 and 4, namely in a position abutting the transverse end plate 41 of the table 2.

The crate-holding bracket assembly 1 is hingedly supported on respective vertical bracket members 4, 4 secured to the transverse wall 41' of the table 2, the hinge connection 42 comprising the transverse hinge shaft 5 extending through loops formed in the top ends of the bracket members 4, 4 and through hinge loops 43, 43 provided on the crate-holding bracket assembly 1.

Designated at 28 is a cover member which is secured to the parallel hinge straps 44, 44, said hinge straps being provided with loops receiving the hinge rod 5, whereby the cover member 28 is swingably connected to the crate-receiving bracket assembly 1 and may be swung into an overlying position with respect to a crate 43' disposed in the bracket assembly 1 as is illustrated in Figure 1.

Figure 6:
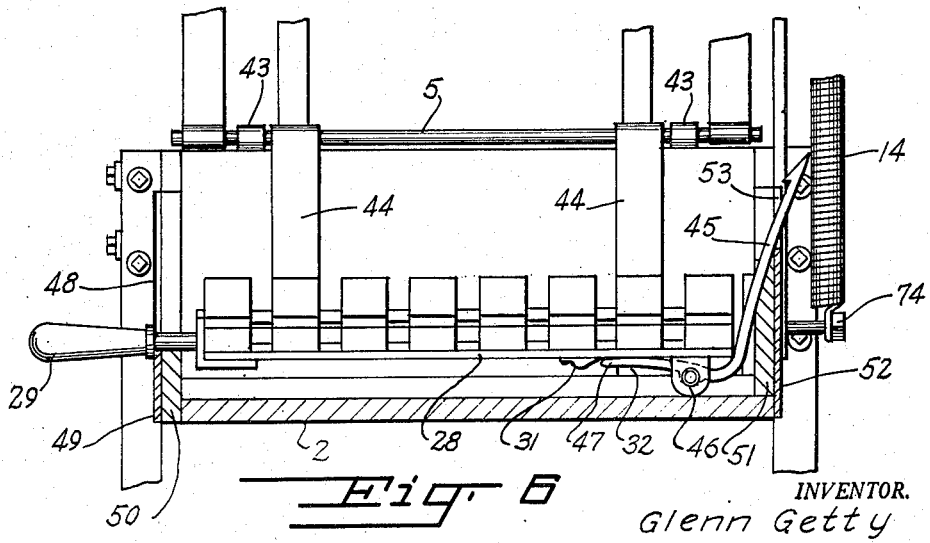
Figure 6 is a vertical cross sectional view taken transversely on the line 6—6 of Figure 4.

Designated at 45 is a hooked latch bar which is pivoted to the cover member 28 at 46 and which is biased counterclockwise, as viewed in Figure 6 by a leaf spring 31 secured to the cover member 28 and engaging between an arm 47 on the hooked latch 45 and the main body of the cover member. The hooked latch member 45 is lockingly engageable with the apertured detent arm 6 provided on the crate-holding bracket assembly 1 to lock the cover member 28 in a closed position overlying a crate 43' received in the bracket assembly 1. When the crate is swung to an inverted position, as will be presently described, the arm 47 is engageable with a striking plate 32 secured on the table 2 to rotate the hooked latch 45 clockwise, as viewed in Figure 6, whereby to disengage said hooked latch from the apertured detent bar 6, thus releasing the cover 28.

Secured to the cover member 28 on the side edge thereof opposite the latch bar 45 is the outwardly projecting handle 29, said handle being receivable in a notch 48 provided in a plate 49 secured to the side wall 50 of the table, as shown in Figures 4 and 5. The opposite side wall 51 of the table is provided with a similar plate 52 having a notch 53 formed in its top edge in which the hooked latch bar 45 is receivable in its released position, as shown in Figure 6. The handle 29 allows the operator to swing the cover member 28 from the opened position thereof shown in Figures 4 and 6 to a closed position thereof overlying the crate 43' wherein the hooked bar 45 is lockingly engaged with the apertured detent bar 6, as above described.

Designated at 7 is a handle member carried on a shaft 27 rotatably received in transversely aligned brackets 54 and 55 on the frame 1 adjacent its outer transverse edge, the shaft 27 being thus supported for rotation around a transverse axis. Designated at 9 is a latch hook which is pivotally connected at 56 to the frame 1 adjacent its hinged connection to the table 2, the latch hook 9 being lockingly engageable with a detent plate 8 secured to the lower marginal portion of the table transverse end wall plate 41. The latch hook 9 is connected by a link rod 10 to the end of an arm 57 projecting from the shaft 27, whereby the latch hook 9 is rotated responsive to rotation of the handle 7. A coiled spring 11 is connected between the end of the link rod 10 and the frame 1, biasing the latch hook element 9 toward locking engagement with respect to the detent plate 8, whereby the frame 1 will be locked in the position thereof shown in Figures 1 and 4 by the engagement of the latch hook 9 with the plate 8 and will be unlatched only when the handle 7 is rotated to disengage hook 9 from detent plate 8.

Designated at 22, 22 are respective hooked crate-engaging members which are slidably mounted for transverse sliding movement in supporting brackets 60 provided on the bottom of the crate-receiving frame 1. The bars 22 are provided with the inwardly projecting hook elements 61 adapted to lockingly engage with the crate 43' when the bars 22 are moved inwardly towards each other. Pivoted to the bottom of the frame 1 at 63 is the plate member 23 and pivotally connected to the opposite end portions of the plate member 23 are the respective pull rods 24, 24 which extend slidably through the flanges of respective angle brackets 64 secured to the bars 22. Respective coiled springs 26 are provided on the rods 24, said coiled springs bearing between the flanges of the respective brackets 64 and stop washers 67 provided on the rods 64 and adjustably retained thereon by respective nuts 68. Respective abutment nuts 69 are provided on the pull rods 24 inwardly adjacent the flanges of the angle brackets 64, as shown in Figure 5. Designated at 21 is a lever member pivoted at 70 to one side portion of the crate-holding bracket assembly 1 and projecting laterally therefrom, as shown in Figure 5. The lever 21 is formed with an arm 71 which is pivotally connected at 72 to the end of a link rod 25, said link rod being pivotally connected at its opposite end to an end portion of the plate member 23. Therefore, rotation of the lever 21 in one direction will cause the plate member 23 to be rotated counter-clockwise, as viewed in Figure 5, causing the hook elements 61 to be pulled inwardly by the cushioned inward force exerted on the flanges of the respective angle brackets 64, 64 by the coiled springs 26. The pointed hooks 61 of the bars 22 are thus caused to securely grip the crate and to hold the crate after it has been positioned in the frame assembly 1. Rotation of the lever 21 in the opposite direction rotates the plate member 23 clockwise, as viewed in Figure 5, causing the abutment nuts 69 to exert positive outward force on the flanges of the angle brackets 64, and causing the hooked ends 61 of the bars 22 to be withdrawn from engagement with the crate.

Secured to the side wall 51 of the table 2 is an upstanding supporting bar 17, to the top end of which is pivotally connected a bar member 18. Connected between one end of the bar member 18 and a bolt 74 extending through the lower end portion of the supporting bar 17 is a coiled spring 14. Connected between the opposite end of the lever bar 18 and an anchoring bolt 75 projecting from a supporting bar 19 secured to the lower outer side portion of the frame 1 is another coiled spring 13. Connected between the pivot bolt 76 on which the bar 18 is pivotally mounted and the anchor bolt 75 is still another coiled spring 12. The portion of the lever bar 18 to which the spring 14 is connected is much shorter than the portion of said lever bar to which the spring 13 is connected, whereby the spring 14 will be initially in a tensed position at the left side of the supporting bar 17, when the crate-supporting frame is in its initial position, as shown in Figures 1 and 4 and will be rotated through a relaxed position to another tensed position on the right side of the supporting bar 17, as viewed in Figures 2 and 3, when the frame 1 is rotated from the position of Figures 1 and 4 to its inverted position, similar to that shown in Figure 3. From Figure 1 it will be seen that the springs 12 and 13 are in tensed positions when the bracket 1 is in its initial position, shown in Figures 1 and 4 and will be relaxed as the frame is inverted, as shown in Figure 3.

Rigidly secured to the table 2 adjacent the end wall 41 thereof and depending below the table is a bracket bar 76' to which is pivotally connected the lever 16. Connected between a selected aperture 77 in the lever 16 and a bracket bar 78 secured to the corner portion of frame 1 is a spring 15, said spring 15 being in a relaxed condition when the frame 1 is in its initial position, namely, the position of Figures 1 and 4 and which becomes tensed as the frame 1 is rotated toward its inverted position, similar to that shown in Figure 3, after the lever 16 comes into contact with an abutment plate 20 secured to the bottom edge of the transverse wall 41.

The table 2 and the cover element 28 are provided with sponge rubber or other suitable resilient linings, shown at 34, whereby the fruit or other produce dumped from the crate when it is in its inverted position, such as that shown in Figure 3, will not be bruised as it drops from the crate.

In operation of the device, the crate is placed in the frame 1 in the manner above described, and is secured therein by rotating the lever 21 in the manner above described, whereby the hook elements 61 engage with the side portions of the crate and lock it in the frame 1. The cover 28 is then rotated to the closed position thereof by means of the handle 29 and latched in said closed position by the interlocking engagement of the latch hooks 45 with the apertured bar 6. The handle 7 is then rotated to disengage the latch hook 9 from the plate 8, and the crate is then elevated from the position of Figure 1 and is rotated around the hinge connection 42. As the crate is moved to the position shown in Figure 2, the springs 14 and 13 become relaxed, the lifting force required to elevate the crate from the position of Figure 1 to the position of Figure 2 being supplied to a substantial degree by the springs 14 and 13. Meanwhile, the bar 16 moves into engagement with the abutment plate 20 on the bottom edge of the transverse wall 41. Continued rotation of the crate in a counter-clockwise direction, as viewed in Figure 2, towards the position thereof shown in Figure 3, causes the spring 15 to become tensed and also causes the spring 14 to become tensed as the spring 14 moves to a position at the right side of the supporting bar 17, as viewed in Figure 3. Thus, the final stages of movement of the crate toward its fully inverted position are cushioned by the tension developed in the springs 14 and 15, enabling the crate to be gently lowered to its final inverted position wherein the release arm 47 of the latch hook 45 is engaged by the striker plate 32. In this final position the cover 28 is released and rests on the table 2, as shown in Figure 3. The crate may then be slightly elevated by means of the handle 7, allowing the fruit or other produce to roll out on the table, said table being preferably slightly inclined, as shown in Figures 1 to 3, whereby the fruit or other produce will roll downwardly along the table by gravity. Since the position of the opened crate may be easily controlled by means of handle 7, and since the crate is counter-balanced to a considerable degree by the tension of the springs 14 and 15, the discharge of the fruit or other produce from the crate in the position of Figure 3 may be readily controlled, and the operator may thus select bruised fruit or produce as said fruit or produce discharges from the crate.

After the crate is emptied, the crate may be returned to the initial position thereof shown in Figure 4 and may be removed after the hook elements 61 are disengaged therefrom in the manner described above.

While a specific embodiment of an improved crate dumping apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A crate dumping apparatus comprising a table, a crate-holding frame hingedly connected to said table for swinging movement from a first position adjacent the table to an inverted position over the table, means for releasably securing a crate in said frame, a lever pivoted at an intermediate portion thereof to the table, respective springs connecting the ends of the lever to the table and to the frame to cushion the swinging movement of the frame, a cover member hinged to said frame and arranged to overlie the top of a crate secured in said frame, means for securing said cover member in overlying relation to said frame, and means automatically releasing said cover member responsive to the movement of said frame to said inverted position.

2. A crate dumping apparatus comprising a table, a crate-holding frame hingedly connected to said table for swinging movement from a first position adjacent the table to an inverted position over the table, means for releasably securing a crate in said frame, a lever pivoted at an intermediate portion thereof to the table for rotation in a vertical plane perpendicular to the axis of rotation of the frame, respective springs connecting the ends of the lever to the table and to the frame to cushion the swinging movement of the frame, a cover member hinged to said frame and arranged to overlie the top of a crate secured in said frame, means for securing said cover member in overlying relation to said frame, and means for releasing the cover member when the frame has reached an inverted position.

3. A crate dumping apparatus comprising a table, a crate-holding frame hingedly connected to said table for swinging movement from a first position adjacent the table to an inverted position over the table, a lever pivoted at an intermediate portion thereof to the table, respective springs connecting the ends of the lever to the table and to the frame to cushion the swinging movement of the frame, a cover member hinged to said frame and arranged to overlie the top of a crate secured in said frame, means for securing said cover member in overlying relation to said frame, and means for releasing the cover member when the frame has reached an inverted position.

4. A crate dumping apparatus comprising a table, a crate-holding frame hingedly connected to said table for swinging movement from a first position adjacent the table to an inverted position over the table, means for releasably securing a crate in said frame, a lever pivoted at an intermediate portion thereof to the table, respective springs connecting the ends of the lever to the table and to the frame to cushion the swinging movement of the frame, a cover member hinged to said frame and arranged to overlie the top of a crate secured in said frame, means for securing said cover member in overlying relation to said frame, means for releasing the cover member when the frame has reached an inverted position, and an additional spring connected between the pivotal axis of said lever and the point of connection of the spring connected to said frame.

5. A crate dumping apparatus comprising a table, a crate-holding frame hingedly connected to said table for swinging movement from a first position adjacent the table to an inverted position over the table, a lever pivoted at an intermediate portion thereof to the table, respective springs connecting the ends of the lever to the table and to the frame to cushion the swinging movement of the frame, a cover member hinged to said frame and arranged to overlie the top of a crate secured in said frame, means for securing said cover member in overlying relation to said frame, means for releasing the cover member when the frame has reached an inverted position, an additional lever pivoted to the table and being engageable with a bottom transverse edge thereof, and an additional cushioning spring connected between said additional lever and said frame.

References Cited in the file of this patent

UNITED STATES PATENTS

| | | |
|---|---|---|
| 1,906,126 | Mott | Apr. 25, 1933 |
| 1,973,767 | Kimball et al. | Sept. 18, 1934 |
| 2,577,091 | Porter | Dec. 4, 1951 |